United States Patent [19]
Anderson

[11] Patent Number: 4,842,875
[45] Date of Patent: Jun. 27, 1989

[54] CONTROLLED ATMOSPHERE PACKAGE

[75] Inventor: Harry S. Anderson, Wilmington, Del.

[73] Assignee: Hercules Incorporated, Wilmington, Del.

[21] Appl. No.: 123,465

[22] Filed: Nov. 20, 1987

Related U.S. Application Data

[63] Continuation-in-part of Ser. No. 37,657, Apr. 13, 1987, abandoned, which is a continuation-in-part of Ser. No. 915,836, Oct. 6, 1986, abandoned.

[51] Int. Cl.$^4$ .................... A23B 7/148; B65D 85/50; B65D 81/20
[52] U.S. Cl. ................... 426/118; 426/106; 426/415; 426/419; 47/84
[58] Field of Search ............. 426/419, 415, 118, 395, 426/396, 316, 324, 418, 106; 47/84

[56] References Cited

U.S. PATENT DOCUMENTS

| | | | |
|---|---|---|---|
| 2,611,709 | 9/1952 | Plagge | 426/419 |
| 3,102,777 | 9/1963 | Bedrosian et al. | 426/419 |
| 3,423,212 | 1/1969 | Purcell et al. | 426/415 |
| 3,450,542 | 6/1969 | Badran | 426/419 |
| 3,450,543 | 6/1969 | Badran et al. | 426/415 |
| 3,450,544 | 6/1969 | Badran et al. | 426/415 |
| 3,507,667 | 4/1970 | Magnen | 426/419 |
| 3,630,759 | 12/1971 | Rumberger | 426/415 |
| 3,795,749 | 3/1974 | Cummin et al. | 426/415 |
| 3,798,333 | 3/1974 | Cummin et al. | 426/415 |
| 3,804,961 | 4/1974 | Cummin et al. | 426/415 |
| 4,055,672 | 10/1977 | Hirsch et al. | 426/396 |
| 4,209,538 | 6/1980 | Woodruff | 426/419 |
| 4,423,080 | 12/1983 | Bedrosian et al. | 426/415 |
| 4,461,420 | 7/1984 | Horvath | 426/395 |
| 4,485,133 | 11/1984 | Ohtsuka et al. | 426/124 |
| 4,487,791 | 12/1984 | Komatsu et al. | 426/124 |
| 4,513,015 | 4/1985 | Clough | 426/396 |
| 4,515,266 | 5/1985 | Myers | 426/419 |

FOREIGN PATENT DOCUMENTS

| | | | |
|---|---|---|---|
| 0178218 | 4/1986 | European Pat. Off. | 426/106 |
| 2033541 | 4/1970 | France | 426/410 |
| 1590579 | 5/1970 | France | 426/419 |
| 2531042 | 2/1984 | France | 426/118 |
| 47-17187 | 5/1972 | Japan | 426/419 |
| 538781 | 3/1978 | Japan | 426/415 |
| 56-10459 | 2/1981 | Japan | 426/106 |
| 740190 | 6/1980 | U.S.S.R. | 426/419 |
| 829484 | 5/1981 | U.S.S.R. | 426/106 |

OTHER PUBLICATIONS

P. Veeraju & M. Karel, Modern Packaging, vol. 40, #2, (1966), "Controlling Atmosphere in a Fresh-Fruit Package", pp. 169-172 & 254.
Encyclopedia of Polymer Science and Technology, vol. 9, John Wiley & Sons, 1968, "Permeability", p. 794.
"Standard Method for Determining Gas Permeability Characteristics of Plastic Film and Sheeting," ASTM D1434-82, 1987, Amend Book of ASTM Standards, vol. 08.01, p. 612.
Package Engineering, 8/74, p. 51
Modern Packaging, 6/48, p. 163-165.

Primary Examiner—Steven Weinstein
Attorney, Agent, or Firm—David Edwards

[57] ABSTRACT

A container providing controlled atmospheric storage of fresh fruits and vegetables to improve retention of product freshness by adjusting the carbon dioxide to oxygen ratio, for the storage of said fruits or vegetable can be attained and maintained, thereby retarding premature maturation and spoilage. The environment is controlled by providing a microporous membrane panel of limited carbon dioxide and oxygen permeability on an otherwise substantially impermeable container. The size of this area is a function of its permeability, the amount and respiration rate of the contents, and the ratio of carbon dioxide to oxygen desired.

5 Claims, 5 Drawing Sheets

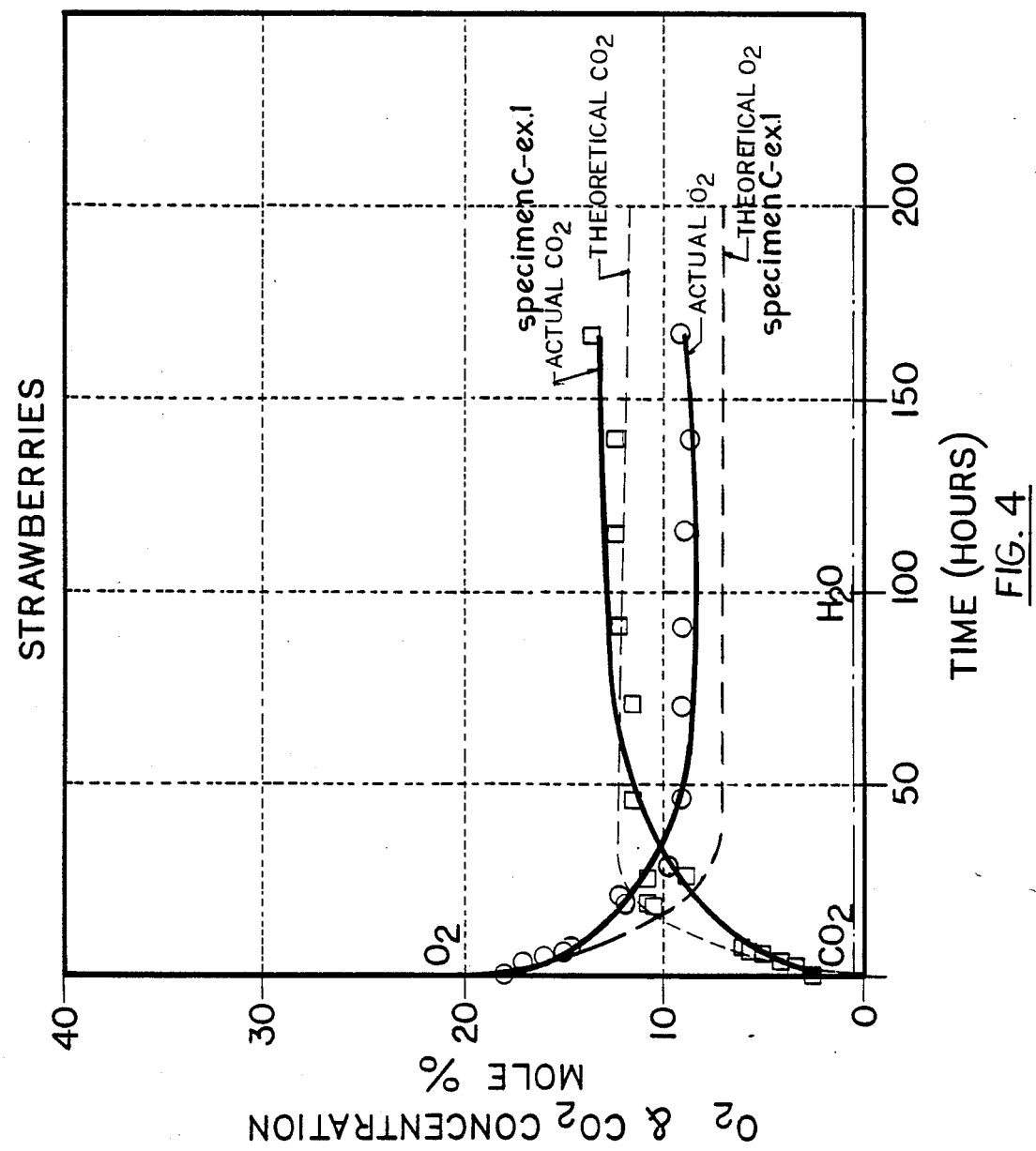

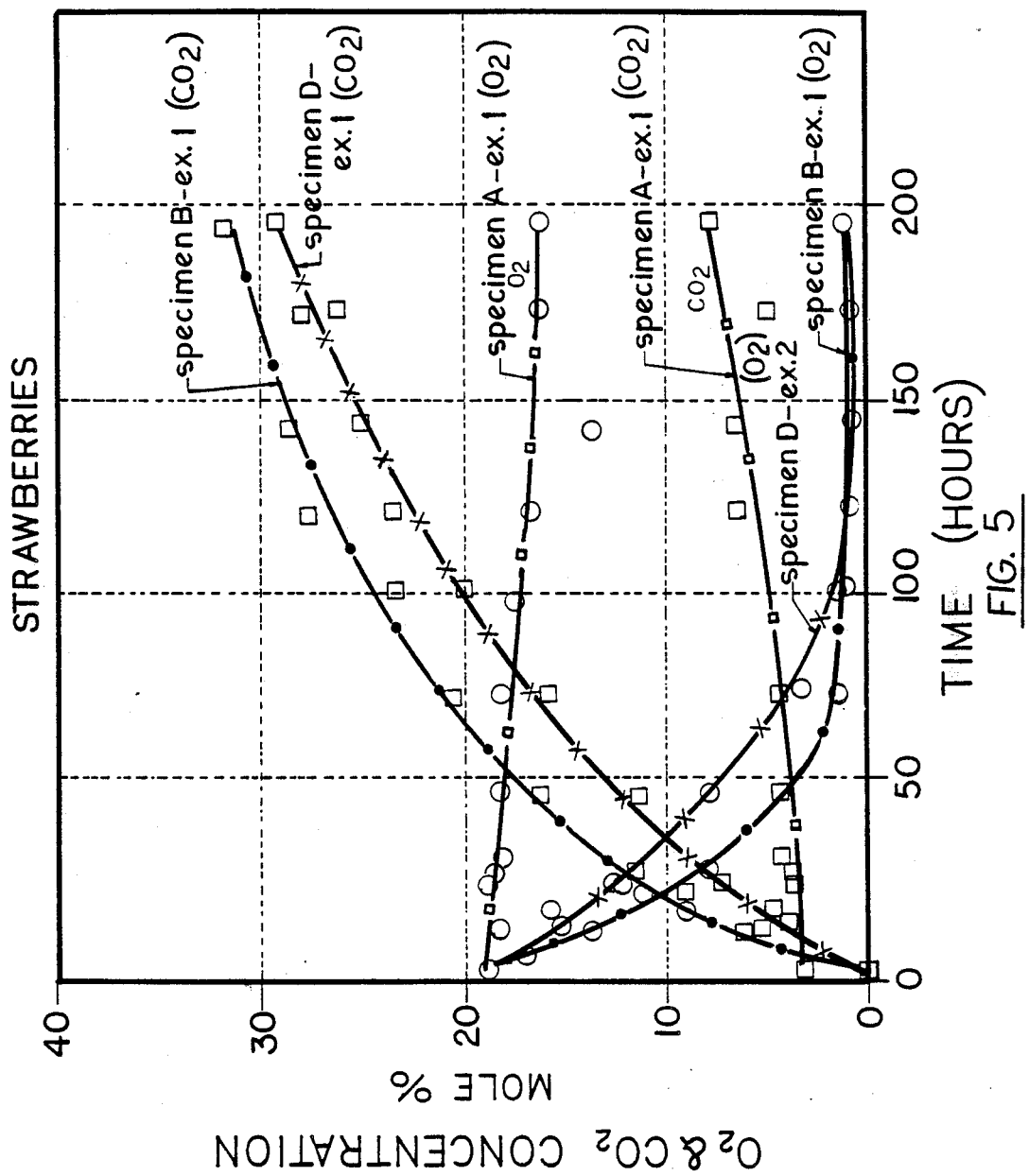

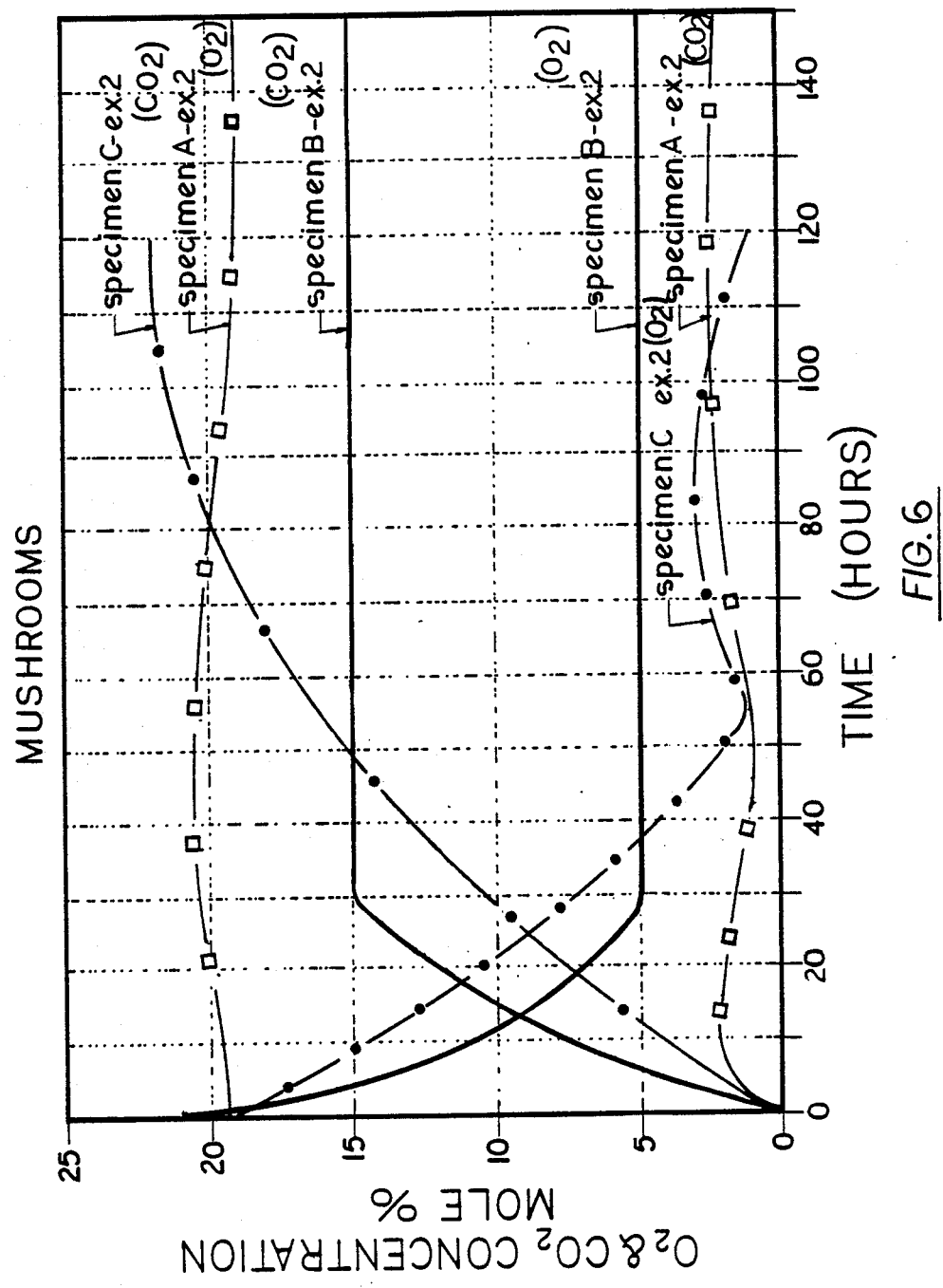

CONTROLLED ATMOSPHERE PACKAGE

This is a continuation-in-part of application Ser. No. 037,657, filed Apr. 13, 1987, now abandoned, which is a continuation-in-part of application Ser. No. 915,836, filed Oct. 6, 1986, now abandoned.

BACKGROUND OF THE INVENTION

This invention relates to the controlled atmospheric storage of fresh fruits and vegetables, and specifically to a method of packaging, and a package, that controls the atmosphere surrounding the packaged fruit or vegetable product to improve retention of product freshness.

Maintaining the flavor, texture and eating qualities of fresh fruits and vegetables, and extending the shelf life of flowers (hereinafter "produce" collectively) from the time of harvest through the time of consumption is an obvious problem. The most commonly used technique has been refrigeration. Some items, such as tomatoes, bananas and citrus fruits, are routinely picked in a less-than-ripe condition and stored at reduced temperatures until they are sold. Other products, such as grapes and lettuce, are picked at maturity and refrigerated. The reduced temperature helps to retard further ripening, but only for relatively short time periods and may be detrimental to the keeping quality of the product after it is exposed to room temperature.

The maturation of produce is a complex series of biochemical and developmental changes. Among the most important processes is respiration, which generally takes place according to the equation:

$$(CH_2O)_n + nO_2 \rightarrow nCO_2 + nH_2O + \text{heat}$$

wherein $(CH_2O)_n$ represents a carbohydrate molecule that is oxidized as the produce respires during maturation on storage.

For each produce type there is an optimum range of concentrations of $CO_2$ and $O_2$ at which its respiration is retarded and quality is improved to the greatest extent. For instance, some produce benefit from relatively high levels of $CO_2$, e.g., strawberries and mushrooms, while others such as lettuce and tomatoes, store better at lower levels of $CO_2$.

Likewise each produce type also has its own individual respiration rate, which can be expressed as cubic centimeters of oxygen per kg/hour.

It is known that the maturation-rate of produce can be reduced by controlling the atmosphere surrounding the produce so that an optimum $O_2$ range and relative concentrations of $CO_2$ to $O_2$ is maintained. For instance, U.S. Pat. No. 3,102,777 suggests storage of produce in a container in which the atmosphere is continuously replenished to maintain a higher level of carbon dioxide than that in air. U.S. Pat. No. 3,450,542 suggests packaging produce (bananas) in bags of polyethylene film that has a greater permeability to carbon dioxide than to oxygen (3.81 mm (150 mil) polyethylene); the volume of air in the package is reduced to leave relatively little oxygen and an appropriate balance between the $CO_2$ produced and $O_2$ consumed by the produce and the relative flows of the two gases through the film is produced and maintained for an appropriate storage period (up to about 28 days). However it is a serious disadvantage that the fixed ratios of permeability involved limit the control of the atmospheric composition.

The published paper "Controlling Atmosphere in a FreshFruit Package" by P. Veeraju and M. Karel, Modern Packaging, Vol. 40, #2 (1966) pages 169–172, 254, partly overcomes that limitation by using variable-sized panels of polyethylene or permeable parchment paper in the walls of an otherwise impermeable package to establish a controlled atmosphere, and shows experimentally-derived calculations to determine the panel sizes that are appropriate for different respiration rates of produce. However, predictable areas of panels based on known respiration rates had to be replaced by variable values calculated for individual situations, and problems were encountered with the use of film, requiring excessive areas of permeable panels (over 258 cm$^2$ (40 in$^2$)) or the use of paper, which is undesirably wettable.

As indicated, the most advanced known controlled atmosphere storage techniques are not entirely satisfactory. There is a need for containers for packaging produce in which the atmosphere can be predictably controlled at approximately the point required to retard the ripening process and retain product freshness, while permitting the use of panels having an area of the order of 25.8 cm$^2$ (4 in$^2$) or less, which can easily be so situated that they are not likely to be blocked by other containers in stacking or handling. The area and permeance required are independently and directly dependent on the weight of produce enclosed.

SUMMARY OF THE INVENTION

This invention is directed to a container capable of creating within it a preselected carbon dioxide and oxygen concentration in the presence of respiring fresh fruit, vegetables or flowers, that is constructed of a substantially gas-impermeable material having a gas-permeable panel in one or more of its walls to provide a controlled flow or flux of $CO_2$ and $O_2$ through its walls, where the panel is a microporous plastic membrane that is a biaxially oriented film comprised of a blend of a propylene homopolymer and a propylene-ethylene copolymer having an ethylene-moeity concentration of 2% to 5% by weight, filled with 40% to 60% of calcium carbonate, based on the total weight of the film, and having an oxygen permeance between about 77,500 and 465,000,000 cc/m$^2$-day-atmosphere (5,000 and 30,000,000 cc/100 in$^2$-day-atmosphere), the permeance and area of the membrane being such as to provide a flux of $O_2$ approximately equal to the predicted $O_2$ respiration rate for not more than 3.0 kg of the enclosed fruit, vegetable or flower, and the carbon dioxide permeance of the membrane being such as to maintain the desired optimum ranges of carbon dioxide and oxygen for not more than the said 3.0 kg of enclosed produce.

BRIEF DESCRIPTION OF THE DRAWINGS

In the attached drawings, in which the same reference characters designate the same elements in the different figures:

FIG. 4 is a series of curves showing the theoretical and experimental equilibration of the carbon dioxide and oxygen atmosphere in a container according to the invention in the presence of fresh strawberries;

FIG. 5 is a series of similar curves for strawberries stored in containers not according to the invention.

FIG. 6 is a series of curves for mushrooms stored in containers according to and not according to the invention;

DETAILED DESCRIPTION OF THE PREFERRED EMBODIMENT

Figure 1:
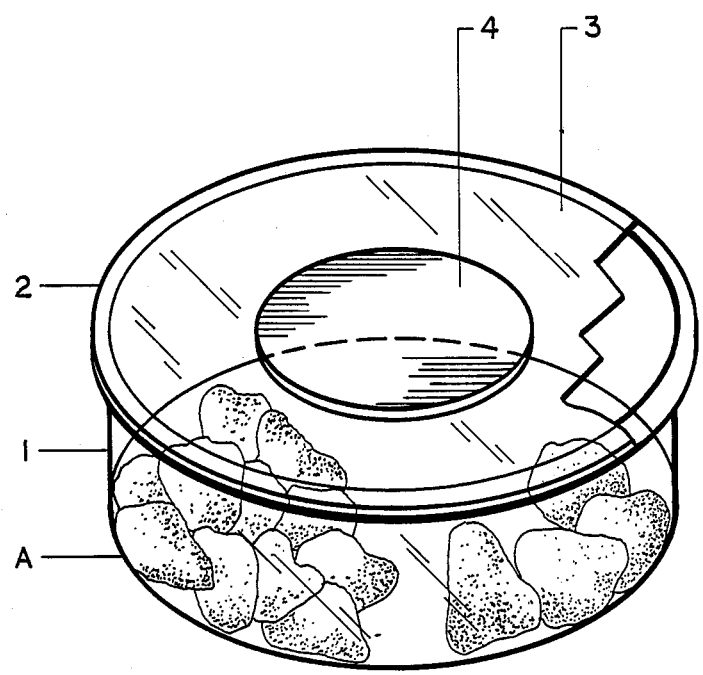
FIG. 1 is a perspective view of a container having a panel according to this invention.

In the following description the units applied to the terms used in reference to the flow of a particular gas through a film are "flux", expressed as cc/day, and "permeance" expressed as cc/$m^2$-day-atmosphere. The "permeability constant" of a particular film is expressed as cc-mm/$m^2$-day-atmosphere. (The values are converted from U.S. usage, from which mils and 100 $in^2$ are replaced by mm and $m^2$ to give the above units. In the pressure units, one atmosphere is 101,325 Pa; they define the partial pressure differences or permeation "driving forces" on opposite sides of the film involving the $CO_2$ or $O_2$ gases involved).

Permeance is measured with an apparatus that employs gas pressure ranging from 6.895 to 206.9 kPa (1 to 30 psi) as the driving force and a mass flow meter to measure the gas flow or flux through the membrane.

The panel in the container of the instant invention is a microporous plastic membrane having an oxygen-permeance between about 77,500 and 465,000,000 cc/$m^2$-day-atmosphere (5,000 and 30,000,000 cc/100 $in^2$-day-atmosphere). Preferably, the gas-permeable panel is a microporous propylene polymer film having a permeance between about 310,000 and 13,950,000 cc/$m^2$-day-atmosphere (20,000 and 900,000 cc/100 $in^2$-day-atmosphere) for produce weighing in the normal range for retail packaging (less than one kg) (2.2 lb). For normal institutional or food-service packaging with higher unit produce weights, the area and permeance of the panel can be increased as required.

More preferably, in a container according to the invention, to predictably control the atmosphere surrounding the packaged fruit or vegetable product, the permeance and area of the membrane is such as to provide a flux of $O_2$ approximately equal to the predicted $O_2$ respiration rate of not more than 3.0 kg (6.6 lb) of enclosed fruit, vegetable or flower, and the carbon dioxide permeance of the membrane being such as to maintain the desired optimum ranges of carbon dioxide and oxygen for not more than the said 3.0 kg (6.6 lb) of enclosed produce.

Also more preferably, in a container according to the invention, the microporous membrane is an oriented film comprised of a blend of a propylene homopolymer and a propylene-ethylene copolymer having an ethylene-moiety concentration of 2% to 5% by weight, the film being filled with 40% to 60% of calcium carbonate, based on the total weight of the film.

The following table records published respiration rates and optimum storage conditions for several popular types of produce:

TABLE 1

|  | Respiration Rate* | | Desired Atmosphere (Vol %) | |
|---|---|---|---|---|
|  | 4° C. | 21° C. | $O_2$ | $CO_2$ |
| Lettuce, head | 8.5 | 28 | 1–5 | 0 |
| Tomato, mature-green | 3.4 | 18 | 3–5 | 0–3 |
| Banana, ripening |  | 44 | 2–5 | 2–5 |
| Avocado | 13 | 107 | 2–5 | 3–10 |
| Peach | 3.9 | 41 | 1–2 | 5 |
| Cherry, sweet | 6.0 | 15 | 3–10 | 10–12 |
| Strawberry | 13 | 76 | 10 | 15–20 |
| Asparagus | 42 | 113 | 21 | 5–14 |

TABLE 1-continued

|  | Respiration Rate* | | Desired Atmosphere (Vol %) | |
|---|---|---|---|---|
|  | 4° C. | 21° C. | $O_2$ | $CO_2$ |
| Mushroom | 36 | 148 | 6–10 | 10–15 |
| Broccoli (main stems + florets) | 50 | 158 | 1–2 | 5–10 |

*Ref: USDA Handbook 66; assume rate @ normal atmosphere. Rate is cc of $O_2$ per kg per hr.

Taking into consideration the respiration characteristics of the produce to be packaged and the optimum $CO_2$ and $O_2$ ranges required to retard its maturation, it is possible to design a container according to the invention for packaging any produce in substantially any quantity.

The ability to control the atmosphere within the container is derived not only from the ability to adjust the area of the permeable plastic membrane that allows communication between the interior and exterior of the container, but also to provide plastic membranes that have relatively high permeance values and therefore provide the necessary flexibility to adapt to a variety of produce. Virtually all thin films of synthetic resin are somewhat permeable by oxygen or carbon dioxide, as shown by known atmosphere-limiting packaging systems, and they may have $CO_2/O_2$ permeance ratios of 1/1 and higher. However, an essentially monolithic and continuous sheet of film is not usually sufficiently permeable to allow the flexibility and precise control of the $CO_2/O_2$ ratio in the atmosphere that is required for optimum retardation of the maturation process, at least without using excessively large panel area/product weight ratios that make the package unduly cumbersome. Thus, the film must be selected to have a permeability sufficient to allow the type of control required within a reasonable time and an area suitable for the amount of produce being packaged.

Since the panel size required varies inversely with the permeability of the membrane, panels with excessively great permeance, that is, greater than about 465,000,000 cc/$m^2$-day-atmosphere (30,000,000 cc/100 $in^2$-day-atmosphere), may have to be so small that they would be difficult to install in a package. If the permeance is less than about 77,500 cc/$m^2$-day-atmosphere (5,000 cc/100 $in^2$-day-atmosphere), the size of the panel may be so large as to be greater than the practical size of the container.

Microporous films and the preparation thereof are known in the art. They can be prepared, for example, by casting a sheet of a mixture of the polymer highly loaded with a filler material and drawing the resultant sheet under orienting conditions to effect orientation of the polymer along its longitudinal and transverse axes. At orienting temperatures, the polymer pulls away from the filler material causing voids and pores to form in the film matrix. The degree of permeability that results is a function of the amount of filler in the polymer, the amount of draw imposed upon the polymer and the temperature at which the drawing is carried out.

A large number of inorganic materials have been shown to be effective as fillers for effecting the voiding and pore formation. These include, e.g., various types of clay, barium sulfate, calcium carbonate, silica, diatomaceous earth and titania. Some particulate organic polymers that are higher melting than the matrix polymer, are also useful fillers, such as polyesters, polyamides and polystyrene.

A particularly useful membrane having the correct porosity characteristics for use in the container of this invention as defined above is a microporous film based on polypropylene comprised of about 40% to 60% of a propylene polymer mixture and 60% to 40% of calcium carbonate, biaxially oriented at a temperature between about 130° and 150° C. The propylene polymer mixture comprises about 45% to 55% propylene homopolymer and about 55% to 45% of a propylene/ethylene copolymer containing about 2% to 5% ethylene by weight. The $CO_2/O_2$ permeance ratio of microporous film of this invention can range from 1:1 to 8:1 with the preferred range being 1:1 to 4:1.

Other film-forming synthetic resins can also be used for the permeance-controlling membrane of the invention. In fact, optimum control of the atmosphere inside the container can be achieved by installing two separate panels of widely different $CO_2/O_2$ permeance ratios, for example, a microporous film having a $CO_2/O_2$ permeability ratio of 1:1 and a membrane having a higher ratio such as 4 to 1 or 8 to 1.

Figure 2:
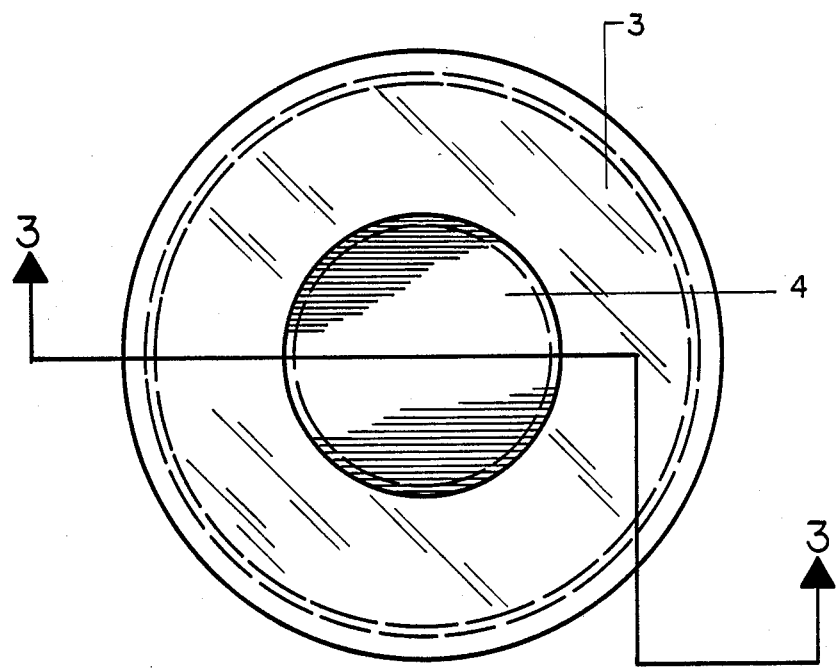
FIG. 2 is a plan view of the same container.
Figure 3:
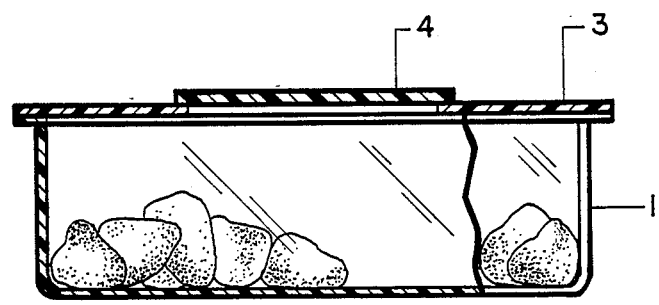
FIG. 3 is a sectional view along line 3—3.

The controlled atmosphere container A shown in FIGS. 1 to 3 consists of a substantially impermeable body portion 1 and a lid 2 comprising a solid substantially impermeable area 3 and a permeable control panel 4. (Although the panel is located on the lid in the embodiment shown, it could be located at any point on the package where it will not be covered by other containers when they are stacked or packed for shipment).

The container can be of any appropriate size, e.g., from as small as 100 cc up to several liters or more. The material of construction of the container is not critical so long as the entire container is impermeable to moisture and substantially impermeable to air except in the control panel area. By "substantially impermeable" is meant a permeability so low that, if the container is sealed with produce inside (without any permeable membrane), the oxygen in the container will be completely exhausted or the oxygen level will equilibrate at such a low level that anaerobic deterioration can occur. Thus glass, metal or plastic can be employed. Plastic materials such as heavy gauge polyolefins, poly(vinyl chloride), or polystyrene are preferred. The plastic materials should be substantially impermeable due to their thickness, but any minor degree of permeability may be taken into account when sizing the panel.

Control of the atmosphere within the container is achieved by proper sizing of the permeable control panel relative to the mass of produce, the free gas space within the filled container, the respiration rate of the produce and the permeability characteristics, i.e., flux rate and $CO_2/O_2$ ratio of the membrane. If the proper relationship between these variables is achieved, a steady state at the desired relative concentration of $CO_2$ and $O_2$ ratio can be reached within about a day or less.

The theoretical curves of FIG. 4 illustrate the establishment of this steady state for one pound of strawberries, stored at 4° C. in a container made of 55.6 in$^2$ of 0.254 mm (10 mil) polystyrene (of which the $CO_2$ permeability constant of 690 cc-mm/m$^2$-day-atmosphere (1753 cc mil/100 in.$^2$-day-atmosphere) and $O_2$ permeability constant of 172.8 cc-mm/m$^2$ day-atmosphere (439 cc mil/100 in$^2$-day-atmosphere) are not substantial enough to affect the operative values used). The container has a 177.4 cm$^2$ (27.5 in$^2$) lid made of 0.0254 mm (1 mil) polyethylene terephthalate (PET) (typically having minor $CO_2$ and $O_2$ permeabilities of 11.2 and 2.3 cc-mm/m$^2$-day-atmosphere (28.4 and 5.8 cc mil/100 in.$^2$/day/atmosphere) respectively, on which a 9.68 cm$^2$ (1.5 in$^2$) opening is covered by 0.0254 mm microporous polypropylene film.

The $O_2$ and $CO_2$ permeances are both 2,325,000, so the $CO_2/O_2$ permeability ratio of the microporous membrane is 1/1. The rigid container contains room air at time zero and has 425 cc of free gas space. It is assumed that the strawberry respiration rate is 12.8 cc $O^2$/kg-hr in room air and varies linearly with the oxygen content of the container, going through zero. Steady state conditions are achieved as described in the following paragraphs.

Oxygen in the container is consumed by the produce as it respires. An approximately equal amount of carbon dioxide is generated. The reduction in oxygen concentration and buildup of carbon dioxide concentration creates a driving force for oxygen to enter and carbon dioxide to exit the container according to the equation:

$$\text{Flux across film} = \frac{\text{Permeability} \times \text{Area}}{\text{Thickness}} \text{(Driving Force)}$$

where the driving force is the difference in the gas concentrations within the container and in the room air.

Initially the driving force is low and the flux across the film is not sufficient to replace the oxygen that is consumed and drive out most of the carbon dioxide that is generated. Thus, inside the container the oxygen content decreases and the carbon dioxide content increases. The decrease in oxygen in the container also causes a decrease in the strawberries' respiration rate. As the strawberries continue to respire, oxygen is consumed, carbon dioxide is generated, respiration rate decreases and the driving forces to replace the oxygen and drive out the carbon dioxide increase. Thus, the fluxes of oxygen and carbon dioxide through the film increase. The combination of these processes proceeds to the point where the consumption of oxygen is equal to the replacement of oxygen in the container by permeation through the film. At this point, a steady state is reached. The approach to steady state is demonstrated by the data in the Tables 2 and 3.

TABLE 2

| Time Increment hr. | | Oxygen Consumed cc | Oxygen in Container cc | Oxygen in Container % | Driving Force$^a$ atm | Oxygen Permeated into Container cc |
|---|---|---|---|---|---|---|
| 0 | 0.5 | 5.59 | 86.4 | 20.3 | 0.007 | 0.08 |
| 0.5 | 1.0 | 5.41 | 83.7 | 19.7 | 0.013 | 0.16 |
| 10 | 10.5 | 3.27 | 51.1 | 12.0 | 0.090 | 1.21 |
| 20 | 20.5 | 2.41 | 37.9 | 8.9 | 0.122 | 1.63 |
| 30 | 30.5 | 2.09 | 32.9 | 7.7 | 0.134 | 1.79 |
| at steady | | 1.88 | 30.6 | 7.2 | 0.140 | 1.88 |

TABLE 2-continued

| Time Increment hr. | Oxygen Consumed cc | Oxygen in Container cc | Oxygen in Container % | Driving Force$^a$ atm | Oxygen Permeated into Container cc |
| --- | --- | --- | --- | --- | --- |
| state | | | | | |

$^a$Driving force = $0.21 - \left( \dfrac{\% \text{ Oxygen in Container} \times \text{Pressure in Container}}{100} \right)$ Pressure in container ∼ 1 atmosphere.

TABLE 3

| Time Increment hr. | | Carbon Dioxide Generated cc | Carbon Dioxide in Container cc | Carbon Dioxide in Container % | Driving Force$^b$ atm | Carbon Dioxide Permeated Out of Container cc |
| --- | --- | --- | --- | --- | --- | --- |
| 0 | 0.5 | 5.59 | 2.9 | 0.67 | 0.007 | 0.11 |
| 0.5 | 1.0 | 5.41 | 5.6 | 1.31 | 0.013 | 0.21 |
| 10 | 10.5 | 3.27 | 37.1 | 8.72 | 0.087 | 1.43 |
| 20 | 20.5 | 2.41 | 48.5 | 11.4 | 0.113 | 1.86 |
| 30 | 30.5 | 2.09 | 51.7 | 12.2 | 0.120 | 1.98 |
| at steady state | | 1.88 | 49.9 | 11.8 | 0.114 | 1.88 |

$^b$Driving Force = $\left( \dfrac{\text{Carbon Dioxide in Container} \times \text{Pressure}}{100} \right) - 0$ Pressure in container ∼ 1 atmosphere.

In this illustration, the time to steady state is on the order of 40 to 50 hours. Shorter times can easily be achieved by either pre-purging the container with the final gas composition or decreasing the free gas space by proper package design, as demonstrated by the following explanation.

If one panel of film that has a $CO_2/O_2$ permeability ratio of 1/1 (which is normal for microporous film) is used, the sum of the $CO_2$ and $O_2$ concentrations, in volume percent, will always be 21%. This is because, as one mole of oxygen is consumed, one mole of carbon dioxide is generated; the driving forces for oxygen replacement and carbon dioxide expulsion are always equal and the film allows equal portions of each gas to permeate.

If the overall $CO_2/O_2$ permeability ratio is greater than 1/1, the sum of the $CO_2$ and $O_2$ concentrations, in volume percent, will always be less than 21%, since more carbon dioxide than oxygen will permeate. The sum can be determined once the variables affecting it are specified, such as $CO_2$ and $O_2$ film permeances, area, $CO_2/O_2$ separation ratios, and produce weight.

The following examples were carried out using a prototype CAP device comprised of a glass vessel having a hermetically sealable lid with an opening of a preselected size therein. This opening was covered with a panel of the material to be tested. The device was also fitted with a tap for taking samples of the atmosphere within the device.

EXAMPLE 1

A series of tests of the container according to the invention were carried out with about 550 grams of strawberries stored at 4° C. Strawberries (as reported in Table 1 above) respire relatively slowly and are optimally maintained in an atmosphere of about 10% oxygen and 10% to 20% carbon dioxide. In four experiments an opening in the lid having an area of 6.45 cm$^2$ (one in$^2$) was covered with:

(A) A microporous polypropylene film having a permeance greater than 465,000,000 cc/m$^2$-day-atmosphere (30,000,000 cc/100 in$^2$-day-atmosphere);

(B) A microporous polypropylene film having an oxygen permeance of about 186,000 cc/m$^2$-day-atmosphere (12,000 cc/100 in$^2$-day-atmosphere);

(C) A microporous polypropylene film having an oxygen permeance of about 2,170,000 cc/m$^2$-day-atmosphere (140,000 cc/100 in$^2$-day-atmosphere); and (D) An opaque homopolypropylene film loaded with about 20% $CaCO_3$ having a permeance of about 4650 cc/m$^2$-day-atmosphere (300 cc/100 in$^2$-day-atmosphere).

The atmosphere in the container was sampled periodically by means of a gas chromotography syringe and the carbon dioxide and oxygen content determined by gas chromotography. In FIG. 4 the carbon dioxide and oxygen content of specimen C are plotted against time, along with the theoretical curve for strawberries discussed hereinabove. Agreement with the theoretical curve is good. Curves for the other three cases are plotted in FIG. 5.

At the end of the test period, the berries were inspected for visual appeal and edibility with the following results:

Specimen A—berries were brown in color, had very noticeable off odor. Not edible. In this instance, the film was so highly permeable that no significant control of $CO_2/O_2$ ratio was established.

Specimen B—berries looked good; had good red color, but had noticeable bad odor. Not considered edible. In this instance, the film was not sufficiently $O_2$ permeable and an anaerobic condition was created.

Specimen C—berries looked good, had good red color and pleasant fresh strawberry odor. Considered edible. This case demonstrates that control is possible and that good results are thereby achieved.

Specimen D—berries looked good, but were not considered edible due to off odor. The impermeability of the elements of this container created an anaerobic condition.

EXAMPLE 2

Another series of tests was carried out with about 460 grams of mushrooms stored at 4° C. Mushrooms are optimally maintained in an atmosphere of about 6% oxygen and 15% carbon dioxide. In these experiments, a 25.8 cm$^2$ (4 in$^2$) opening was covered with:
- (A) a microporous polypropylene film having a permeance greater than 465,000,000 cc/m$^2$-day-atmosphere (30,000,000 cc/100 in$^2$-day-atmosphere); and
- (B) a porous polypropylene film having a permeance of about 1,860,000 cc/m$^2$-day-atmosphere (120,000 cc/100 in$^2$-day-atmosphere).

A third portion of mushrooms (specimen C) was packaged in a substantially impermeable container without the control panel.

The atmosphere in the container, maintained at 4° C., was sampled periodically and the carbon dioxide and oxygen content plotted against time as in Example 1. These curves are shown in FIG. 6. In the curves it can be seen that in the package identified as A, no control over the atmosphere was effected, whereas in package B, after about 30 hours, the atmosphere reached a steady state at about 5% oxygen and about 15% carbon dioxide. In package C, with no provision for oxygen entering or carbon dioxide exiting, the CO$_2$/O$_2$ ratio was essentially reversed after about 60 hours and remained at that point.

At the end of the test period, the mushrooms were inspected for visual appeal and edibility with the following results:

Specimen A mushrooms were completely rotted;

Specimen B mushrooms retained their original creamy white color, had no off-odor and were considered edible.

Specimen C mushrooms looked good and had no off-odor, but were inedible due to the essentially anaerobic condition existing in the container.

EXAMPLE 3

A series of tests of the device were carried out with 50 g of detached broccoli florets stored at 4° C. Optimum atmospheric conditions for storing whole broccoli are reported to be 1% to 2% of oxygen and 5% to 10% of carbon dioxide (see Table 1). (Optimum gas compositions for extending the shelf life of broccoli florets have not been clearly defined in the literature). In these experiments a 25.8 cm$^2$ (4 in$^2$) opening in the lid was covered with:
- (A) a PVC film having an oxygen permeance of 38,750 cc/m$^2$-day-atmosphere (2500 cc/100 in$^2$-day-atmosphere and a carbon dioxide permeance of 1,860,000 cc/m$^2$-day-atmosphere (120,000 cc/100 in$^2$-day-atmosphere).
- (B) a microporous polypropylene film having an oxygen permeance of 7,362,500 cc/m$^2$-day-atmosphere (475,000 cc/100 in$^2$-atmosphere-day) and a carbon dioxide permeance of 8,215,000 cc/m$^2$-day-atmosphere (530,000 cc/100 in$^2$-day-atmosphere.
- (C) an impermeable barrier.

A fourth portion of broccoli florets (Specimen D) were stored uncovered in air at 4° C.

The atmosphere in the containers was sampled periodically over an 8 to 13 day period by means of a gas chromotography syringe and the carbon dioxide and oxygen content were determined by gas chromatography. Twelve days were required for the carbon dioxide and oxygen contents of Specimen A to reach steady state at 9% and 2.5%, respectively. The gas composition of Specimen B reached steady state at 4% carbon dioxide and 17% oxygen after 2 days. Carbon dioxide content in Specimen C was greater than 20% and the oxygen content was 1% after 3 days storage.

At the end of eight days, broccoli florets were inspected for visual appeal and edibility with the following results:

Specimen A—Florets had lightened in color, had softened in texture and exhibited a very objectionable sulfur off-odor, which made the vegetable organoleptically undesirable.

Specimen B—Florets were a rich dark green color and had no off-odor. The vegetable had a pleasant, fresh flavor, and a crisp texture. No objectionable odor was noticeable beyond that normally associated with broccoli.

Specimen C—Floret color had lightened and an objectionable sulfur odor was present. Not edible.

Specimen D—Florets were dessicated and their stems had lost their normal firmness. Not edible.

A similar experiment using 500 g of detached broccoli florets and a 6.45 cm$^2$ control membrane of a microporous polypropylene film having a permeance of 465,000,000 cc/m$^2$-day-atmosphere (30,000,000 cc/100 in$^2$-day-atmosphere) preserved the florets in good condition. A further experiment using 500 g of detached broccoli florets and a 6.45 cm$^2$ control membrane of a microporous polypropylene film having a permeance of 620,000,000 cc/m$^2$-day-atmosphere (40,000,000 cc/100 in$^2$-day-atmosphere) showed no control of the atmosphere in the container and failed to preserve edibility for 14 days.

I claim:

1. A container for retarding the maturation of respiring fresh produce selected from the group consisting of fruit, vegetables, or flowers contained therein by creating within the container a preselected carbon dioxide and oxygen concentration in the presence of said respiring fresh fruit, vegetables or flowers, said containers being constructed of a substantially gas-impermeable material completely enclosing said fresh fruit, vegetables or flowers, said gas impermeable material having a gas-permeable panel in one or more its walls to provide a controlled flow or flux of CO$_2$ and O$_2$ through its walls, where the panel is a microporous plastic membrane that is a biaxially oriented film comprised of a blend of a propylene homopolymer and a propylene-ethylene copolymer having an ethylene-moeity concentration of 2% to 5% by weight, filled with 40% to 60% of calcium carbonate, based on the total weight of the film, and having an oxygen permeance between about 77,500 and 465,000,000 cc/m$^2$-day-atmosphere, the permeance and area of the membrane being such as to provide a flux of O$_2$ approximately equal to the predicted O$_2$ respiration rate for not more than 3.0 kg of the enclosed fruit, vegetable or flower, and the carbon dioxide permeance of the membrane being such as to maintain the desired optimum ranges of carbon dioxide and oxygen sufficient for optimum retardation of the maturation process of said produce for not more than the said 3.0 kg of enclosed produce.

2. The container of claim 1, wherein the microporous membrane has an oxygen permeance between about 310,000 and 13,950,000 cc/m$^2$-day-atmosphere.

3. A container of claim 2, wherein the microporous membrane has a carbon dioxide to oxygen permeance ratio of about 1 to 1.

4. The container of claim 1 wherein the container has two permeable control membranes having different $CO_2/O_2$ permeance ratios.

5. The container of claim 4 wherein the $CO_2/O_2$ permeance ratios are in the range of 1 to 1 to 4 to 1 inclusive.

* * * * *

UNITED STATES PATENT AND TRADEMARK OFFICE
CERTIFICATE OF CORRECTION

PATENT NO. : 4,842,875

DATED : JUNE 27, 1989

INVENTOR(S) : ANDERSON (H.S.) 1-2,-3

It is certified that error appears in the above-identified patent and that said Letters Patent is hereby corrected as shown below:

Column 6, Line 22

"$O^2$" should read --$O_2$--

Column 9, Line 12

"porous" should read --microporous--

Column 10, Claim 1, Line 42

"containers" should read --container--.

Signed and Sealed this

Twenty-second Day of May, 1990

Attest:

HARRY F. MANBECK, JR.

*Attesting Officer*  *Commissioner of Patents and Trademarks*